(12) United States Patent
Jarrett

(10) Patent No.: US 11,644,083 B1
(45) Date of Patent: May 9, 2023

(54) FASTENER WITH INDEPENDENTLY OPERATING LOCKS

(71) Applicant: Charissa Jarrett, Colorado Springs, CO (US)

(72) Inventor: Charissa Jarrett, Colorado Springs, CO (US)

( * ) Notice: Subject to any disclaimer, the term of this patent is extended or adjusted under 35 U.S.C. 154(b) by 0 days.

(21) Appl. No.: 17/837,878

(22) Filed: Jun. 10, 2022

(51) Int. Cl.
*F16G 11/00* (2006.01)
*A43C 7/00* (2006.01)
*F16G 11/10* (2006.01)

(52) U.S. Cl.
CPC .............. *F16G 11/101* (2013.01); *A43C 7/00* (2013.01)

(58) Field of Classification Search
CPC ..... Y10T 24/37; Y10T 24/3969; Y10T 24/39; Y10T 24/3713; Y10T 24/3984; F16G 11/101; A43C 7/00
See application file for complete search history.

(56) References Cited

U.S. PATENT DOCUMENTS

| | | | |
|---|---|---|---|
| 3,074,135 A | 1/1963 | Brodowski | |
| 3,080,867 A * | 3/1963 | Eichinger | F16G 11/14 439/817 |
| 4,393,550 A * | 7/1983 | Yang | A43C 7/00 24/115 G |
| 5,361,461 A | 11/1994 | Anscher | |
| 5,778,904 A | 7/1998 | Elsner | |
| 6,026,548 A | 2/2000 | Jackson | |
| 6,182,672 B1 | 2/2001 | Abasta-Douglas et al. | |
| 6,189,186 B1 | 2/2001 | Boden | |
| 6,510,627 B1 * | 1/2003 | Liu | A43C 7/00 36/50.1 |
| 6,568,048 B2 * | 5/2003 | Liu | A43C 7/00 24/712.2 |
| 6,601,589 B2 | 8/2003 | Ericks | |
| 7,574,786 B2 * | 8/2009 | Cheng | F16G 11/101 24/712.2 |
| 7,621,279 B1 | 11/2009 | Anagnostou | |
| 2006/0130297 A1 * | 6/2006 | Liao | A43C 11/00 24/712.5 |

(Continued)

*Primary Examiner* — Robert Sandy
*Assistant Examiner* — Michael S Lee
(74) *Attorney, Agent, or Firm* — Larry J. Guffey, Esq.; Oliver & Grimsley, LLC

(57) ABSTRACT

A fastener that holds two portions of a cord-like material, which has ends, in a temporarily locked position until a prescribed force is applied to these ends to cause the material to slide though the fastener, includes (a) a rear enclosure having a cavity with two holes and two openings that each have a centerline, (b) a front enclosure having two apertures, each with a centerline, (c) a pair of movable posts, each having a centerline, and wherein the enclosures and posts are configured so that their respective centerlines can temporarily be brought into alignment so as to allow an end of the material to pass through the fastener, and (d) a pair of springs, each in contact with the bottom of a post. Wherein, the spring has a spring constant (k) and the post has a coefficient of friction ($c_f$) with respect to the material, and k and $c_f$ are chosen to yield a prescribed force in the range of 2 to 25 pounds.

20 Claims, 5 Drawing Sheets

(56) References Cited

U.S. PATENT DOCUMENTS

2012/0159752 A1* 6/2012 Kawaguchi ............ A43C 11/00
　　　　　　　　　　　　　　　　　　　　　　　　　24/712
2020/0187596 A1* 6/2020 Krout .................... A43C 11/24
2023/0023027 A1* 1/2023 Chang .................... A43C 7/00

* cited by examiner

FASTENER WITH INDEPENDENTLY OPERATING LOCKS

BACKGROUND OF THE INVENTION

1. Field of the Invention

The present invention relates generally to fasteners, and more particularly to an easily operable, reusable, fastening device having two independently operating locks.

2. Description of the Related Art

Presently, there are many different types of reusable fasteners. See, for example, U.S. Pat. Nos. 3,074,135, 5,361,461, 5,778,904, 6,026,548, 6,182,672, 6,189,186, 6,601,589, and 7,621,279.

New applications are being discovered every day that can make use of such reusable fasteners. One such application was recently discovered, and it involves a new means for securing a shoe's shoelaces. See U.S. Pat. No. 6,026,548. The device disclosed in this patent is a spring-loaded fastener having two holes (through which the ends of a shoelace pass) in its locking mechanism. With this device, to lock a shoe's shoelace, one pushes down (against the resistance of a spring) on the device's locking button to allow one to move the device/fastener (on the shoelace whose ends that pass through the device's holes) to as close to the top of the shoe wearer's foot as possible. One then lets this locking button come up to lock in place the portions of the shoelace that are currently located in the fastener's holes. Such a fastener is designed to essentially never allow a shoelace to move through the fastener's holes once the fastener's locking button comes up to temporarily lock the shoelace.

Another such application involves that which is addressed by the present invention. It appears that an improved (e.g., by being easier to use, especially for children) means is needed for securing in place a portion of the hair (e.g., that portion which comes into contact with the clasping device) of one who has long (e.g., shoulder length) hair. There are obviously many devices that are already being used for this purpose. They include items which can be tied, such as ribbons, bands, strings, and ropes; and mechanisms which have their own locks, such as barrettes, clips, and clasps, also fabric rings, wraps, and hair pins.

Despite this prior art, there continues to be a need for improved, easily operable, reusable fasteners. The present invention provides such an improved fastener that can be configured to work with a wide range of cord-like (e.g., cords, ribbons, bands strings, ropes) members or elements.

DESCRIPTION OF THE PREFERRED EMBODIMENT

Figure 1:
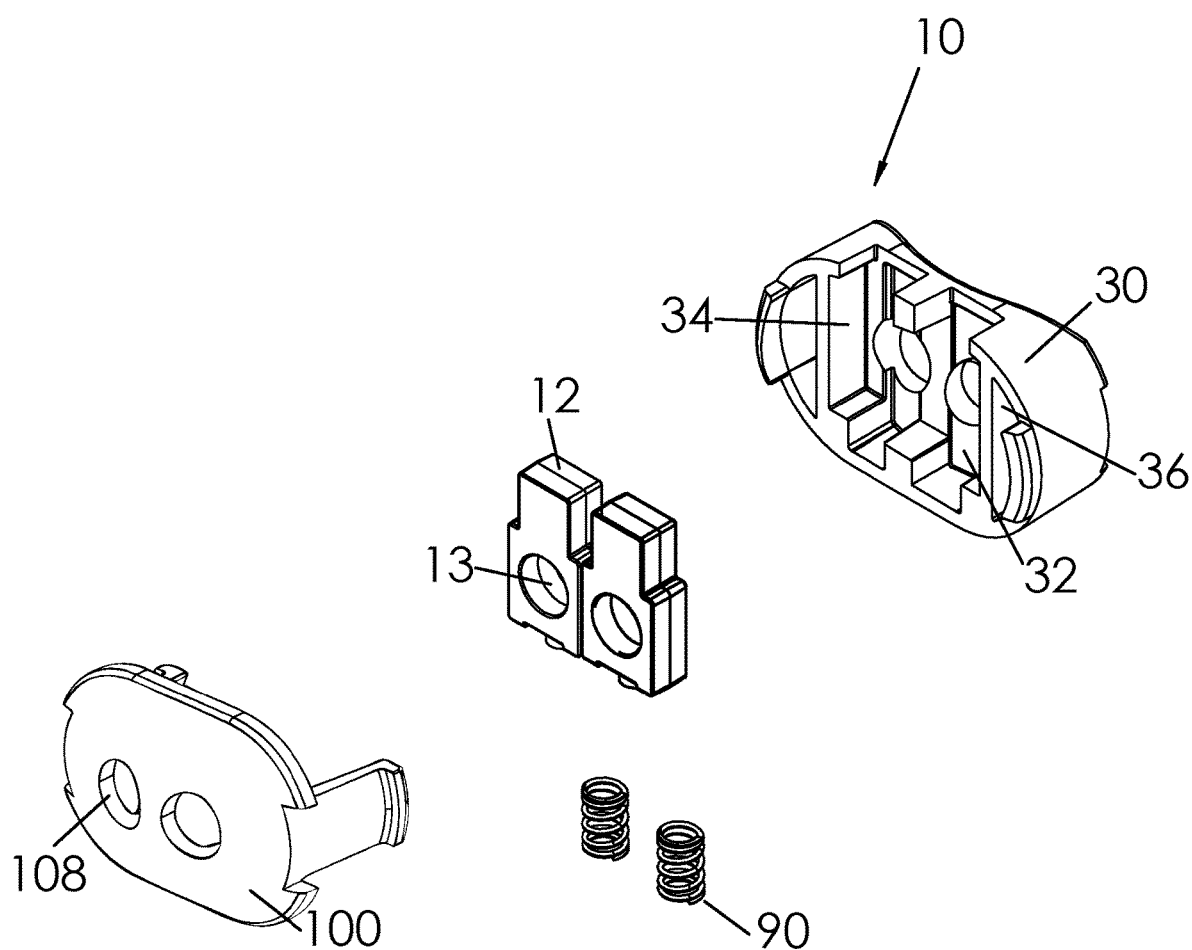
FIG. 1 is an exploded, perspective view of a preferred embodiment of the present invention in the form of an easily operable, reusable, fastening device having two independently operating, spring-loaded locks.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Referring to FIG. 1, there is illustrated an exploded, perspective view of a preferred embodiment of the present invention 10. In this embodiment, the present invention takes the form of an easily operable, reusable, fastening device having two independently operating, helical, spring-loaded locks or posts 12.

This fastener is configured to hold two portions of a cord that are upstream of the cord's ends, and where each of these ends is fed through an orifice 13 that exists in each of the device's posts. As will be seen below, the device serves to temporarily lock the fastener-held portions of the cord into their held positions unless a sufficient force is applied to the cords to pull them through the locks.

The main elements of this fastener 10 include the previously mentioned posts 12, a rear enclosure 30, a front enclosure 100 and a pair of springs 90. As seen in FIG. 1, this rear enclosure has a front opening 32 with a boundary edge 34 that opens to a cavity 36. This rear enclosure also has an interior surface 40 and an exterior surface 70 that are separated by the enclosure's boundary edge.

The rear enclosure's exterior surface 70 has top 72 and rear 74 portions. Meanwhile, its interior surface 40 has top 42, bottom 44 and side 46 portions with a vertical centerline 50 therebetween. This interior surface also has a pair of parallel vertical members 48, each of which is spaced apart from the rear enclosure's vertical centerline. See FIGS. 2C-2D.

These vertical members 48 are configured and positioned in the device to limit any lateral movement of the posts. Outside of each of these spaced-apart, vertical members is a secondary cavity 52, each of which is configured to assist in tying the device's front and rear enclosures together.

The top portion 72 of the rear enclosure's exterior surface is seen to have a pair of spaced-apart holes 76, each of which is spaced apart from this enclosure's vertical centerline and has a section 78 that includes a portion of this enclosure's boundary edge. Each of these holes is configured to receive the top portion of one of the posts 12 as the posts move up and down within the fastener to lock in place the portions of the cord that pass through the holes in the fastener. See FIGS. 2C-2D.

The rear portion 74 of the rear enclosure's exterior surface is seen to have a first pair of spaced-apart openings 80. Each has a horizontal opening centerline 82 and an opening surrounding surface 84 that is configured to allow a cord end to move through the opening 80. Near or proximate the sides of this rear portion are found a second pair of spaced apart openings 86. These are configured to aid in tying the device's front and rear enclosures together. See FIG. 2C.

Each of the fasteners' pair of opposing, movable posts 12 has a top 14, a bottom 16, and a boundary perimeter or side 18. Each of them also has a top section 20 and a bottom 22 section with a neck 24 therebetween. This top section has a specified height and an outer surface 26 that is configured to allow this top portion to move up and down for a specified length through either of the fastener's spaced apart holes 76.

Meanwhile, a post's bottom section has a flat side 28 that, when the post is situated in the fastener, is proximate the rear enclosure's vertical centerline 50. This flat side is provided so that the posts can touch and slide against each other when the posts are located in the fastener. The materials of construction of these posts and their flat sides are chosen so that the sides' coefficient of friction is such that it allows them to easily slide against each other and move vertically up and down in the rear enclosure's holes. See FIGS. 2E-2F.

Each of these posts also has an orifice 13 with an orifice centerline 15 and an orifice surrounding surface 17. This surface is configured to allow a cord end to temporarily move through it. The bottom of these posts additionally each have a knob 25 that it is configured to locate the top of the spring that pushes upward against the bottom of this post and ensure that the spring does not slip off the bottom of this post. See FIG. 2E.

Figure 2A:
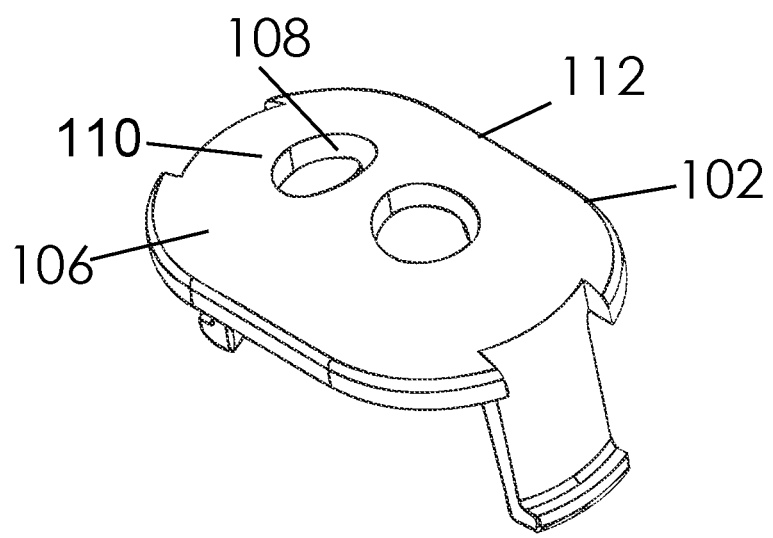
FIG. 2A is an exploded, perspective view of a preferred embodiment of the front portion of the front enclosure of the present invention.
Figure 2B:
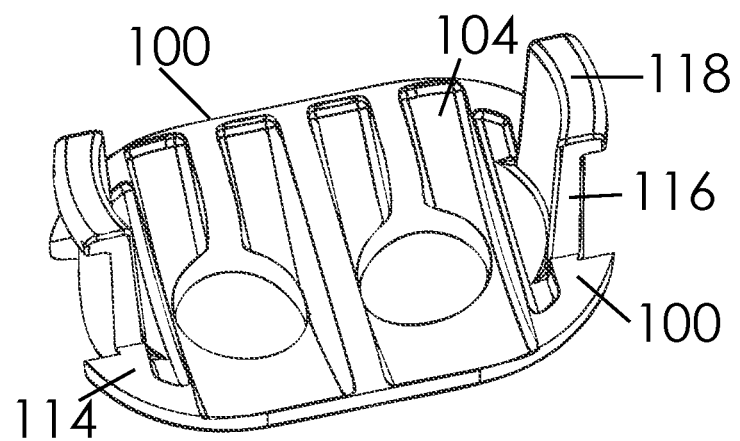
FIG. 2B is an exploded, perspective view of a preferred embodiment of the rear portion of the front enclosure of the present invention.
Figure 2C:
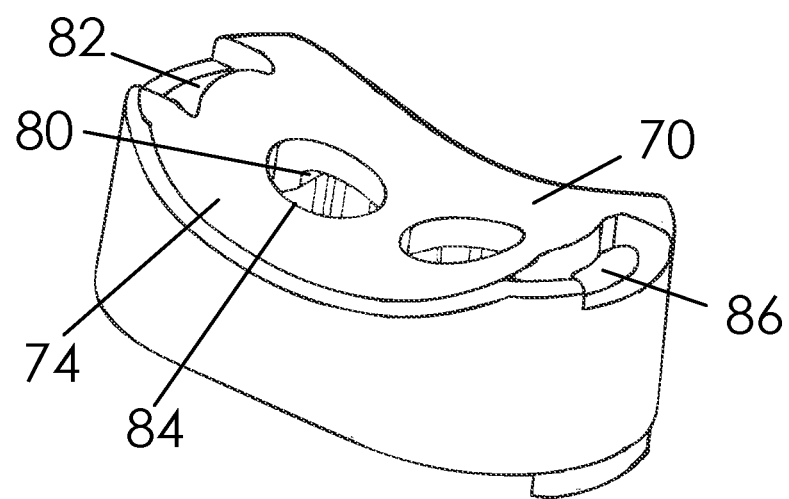
FIG. 2C is an exploded, perspective view of a preferred embodiment of the exterior surface of the rear enclosure of the present invention.
Figure 2D:
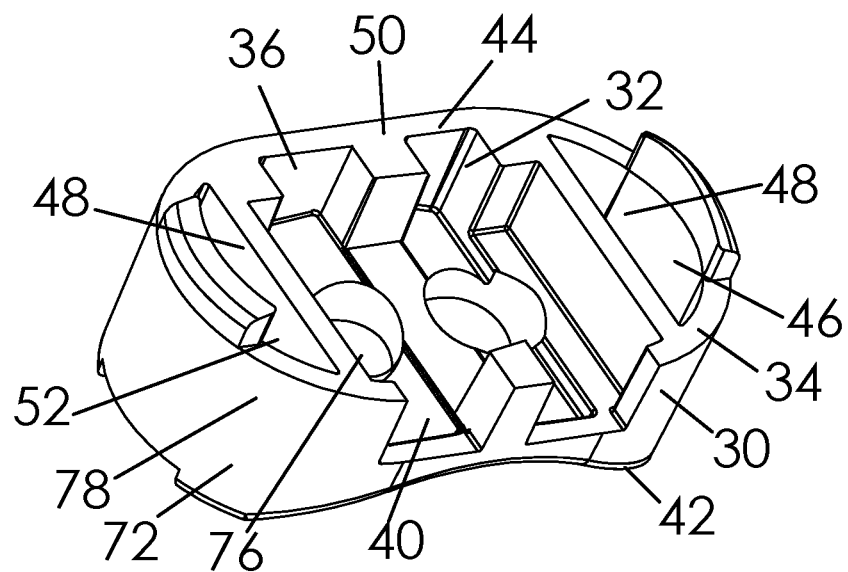
FIG. 2D is an exploded, perspective view of a preferred embodiment of the interior surface of the rear enclosure of the present invention.
Figure 2E:
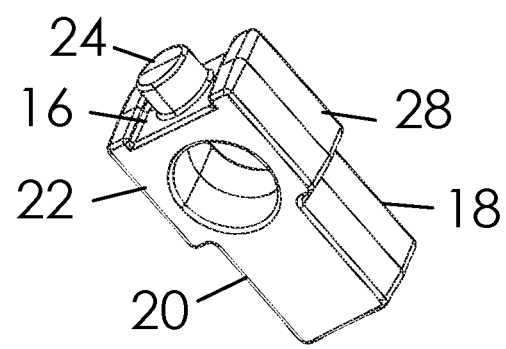
FIG. 2E is an exploded, top-perspective view of a preferred embodiment of one of the posts of the present invention.
Figure 2F:
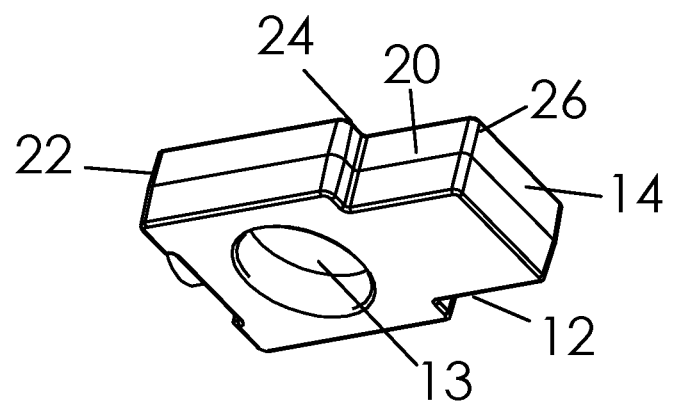
FIG. 2F is an exploded, side-perspective view of a preferred embodiment of one of the posts of the present invention.

FIGS. 2A-2B reveal that the fastener's front enclosure 100 has a perimeter edge 102 and an interior 104 and exterior 106 surfaces with a pair of spaced-apart apertures 108 that extend through these surfaces. This perimeter edge 102 is configured to match and mate with the front enclosure's boundary edge 34 so that these opposing edges can be locked together to form the fastener's housing.

Each of the apertures 108 of this front enclosure has an aperture enclosing surface 110 and a horizontal aperture centerline 112. This aperture's enclosing surface is configured to allow an end of a cord or cord-like material to temporarily move through it.

Near both of the side portions 114 of the front enclosure's perimeter edge is a vertically protruding member 116 which has a locking tip 118. Each of these members are configured so that it can pass through one of the rear enclosure's secondary cavities 52 so as to allow its tip 118 to tie into the second opening 86 which lies at the bottom of this cavity and in the rear enclosure's exterior surface 70. This tying of the tip 118 into the second opening 86 serves to tie the front and rear enclosures together so that they form a housing. This is convenient in that the components of the present invention can be snapped together rather than glued, etc.

Figure 2G:
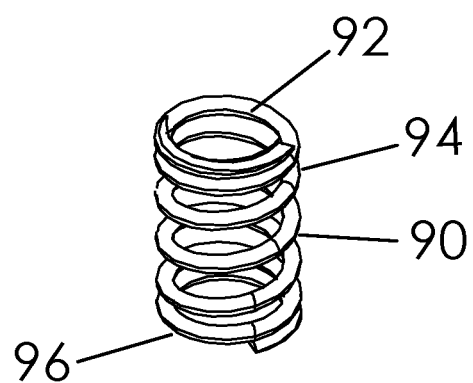
FIG. 2G is an exploded, perspective view of a preferred embodiment of one of the springs of the present invention.

FIG. 2G shows one of a pair of springs 90 that are used in the present invention. Each has a helical shape with an opening 92 at its top surface 94 which is configured to allow a post's knob 25 to fit into this opening and lock the top of a spring to a post. The spring itself also has a bottom surface 96 and it is configured to fit into the portion of the cavity that is created by the width of the space between the rear enclosure's vertical centerline 50 and the adjoining vertical member 48. It is also configured to sit within this space so that the spring's bottom rests on the portion of the rear enclosure's interior surface 40 that is directly beneath it and the top of the spring rests on the knob 25 on the bottom of one of the above post whose top portion extends through one of the rear enclosure's spaced-apart holes 76.

Assembling each of the above-mentioned components in the manner suggested by FIG. 1 yields the present invention. It can be seen that the front and rear enclosures have been configured so that the horizontal centerlines 112, 82 of their apertures and holes coincide so as to allow the end of a cord-like material to be threaded directly through these apertures and holes (depending on the location of the fastener's posts). The height of the top section of a post is seen to have been selected so that when it is fully depressed into the fastener, the post's orifice horizontal centerline 15 temporarily aligns with the aperture and opening centerlines 112, 82, thereby allowing the end of a cord to be directly threated though the aligned aperture, orifice and opening.

Releasing the downward pressure on the top of a post allows it, under the force of the spring, to rise so that its orifice's contact with a portion of a cord temporarily locks this portion into the fastener.

It was previously mentioned that this fastener is unique in that, among other reasons, it has been designed and engineered to allow a cord to pass through its locks when a specified force is exerted on the ends of the cord-like material which has portions that are being secured by the fastener's independently operating locks.

This fastener ability is achieved by selecting its materials of construction specifically so as to provide this ability. For example, each spring is chosen, in part, so that its spring constant (k) is sufficient to drive a post upward until its neck 24 comes to rest temporarily against the interior surface 40 of the enclosure's cavity. In this orientation, the horizontal centerline 15 of this orifice is not in alignment with the centerlines 82, 112 of the adjoining opening and aperture.

This spring constant is also chosen to ensure that any cord passing through the orifice of its post is held firmly in place until a specified pulling force is exerted on the end of the cord so as to unlock it and cause the cord to slide and move through the post's orifice. Additionally, the material of construction of the post and any cord-like material passing through its orifice are chosen so that their coefficient of friction ($c_f$) is, in conjunction with the spring's upward force, sufficient to have the resulting frictional forces that are exerted on any cord when one pulls on its end be such as to prevent the movement of the cord until a sufficiently sized force is exerted.

This additional cord-sliding ability of the present invention, with its independently operating and especially engineered posts, is seen to be quite different from and contrary to the spring-loaded, two-holed-post fastener previously referenced in U.S. Pat. No. 6,026,548. This prior fastener was designed to itself be moved along the chord (towards whatever is to be locked by the prior fastener) when the fastener was opened and, when released, to not thereafter allow a cord to slide through its locking mechanism. It can also be noted that this prior fastener required two hands to operate (one hand to hold the chords and one hand to hold down the fastener's locking mechanism and move it one the chords). This is different than the current invention which can be operated by one hand pulling on the end of one of its chords. Thus, the present invention is much easier to use than the prior fastener and why it is especially useful when used as a fastener for a child's hair (i.e., for example, to hold a pony tail).

To further clarify the unique, sliding-through-its-post ability of the present invention, consider the situation where the fastener of the present invention is being designed to secure the ponytail of a child. In this situation, we want the fastener (assumed to be similar to that shown in FIG. 1) to be small and not require too great a force or prescribed force on the end of its cord to cause the cord to slide through the fastener and tighten around a child's ponytail. Such a fastener might be sized as follows:

|  | Range |
| --- | --- |
| Rear enclosure width | 0.6-0.8 inches |
| Rear enclosure height | 0.4-0.6 inches |
| Post hole diameter | 0.1-0.2 inches |
| Size of the square shaped top of the post | 0.15-0.2 inches |
| Change in height of the spring | 0.09-0.15 inches |
| Force necessary to allow cord movement | 2-3 pounds |
| Coef. of Friction of plastic post & elastic cord | 0.4-0.7 |
| Spring Constant | 30-40 pounds/inch |
| Prescribed force | 2-3 pounds |

The fastener of the present invention can also be sized appropriately and used in many other applications (e.g., to reusably be tied around packages, books, and luggage of all sizes). In such applications, the force required on the end of a cord-like material (that passes through the fastener) might be much greater to cause it to slide through the fastener's posts (e.g., in the range 10-25 pounds or larger). This would clearly require the use in the fastener of much larger and stronger springs or spring-like elements.

Additionally, it should be noted that the elements of the fastener of the present invention can be arranged differently and still allow the fastener to function as described above. For example, rather than having both of the tops of the posts extend through holes in the rear enclosure's top, one of these posts could be flipped so that it extends through a hole in the bottom of the rear enclosure. All such element reconfigurations and re-orientations are considered to be within the scope of the present invention.

The foregoing is considered as illustrative only of the principles of the present invention. Further, since numerous modifications and changes will readily occur to those skilled in the art, it is not desired to limit the invention to the exact construction and operation shown and described herein. Accordingly, all suitable modifications and equivalents may be resorted to, falling within the scope of the invention that is hereinafter set forth in the claims to the invention.

I claim:

1. A fastener that holds two portions of a cord-like material, which has ends, in a temporarily locked position until a prescribed force is applied to said ends to cause said material to slide though said fastener, said fastener comprising:
  a rear enclosure having a cavity and a top portion with two holes, and a rear portion having two openings, each with a centerline,
  a front enclosure having two apertures, each with a centerline,
  a pair of independently-acting, movable posts, each being located in said cavity and having a top and a bottom portion and an orifice with a centerline,
  wherein said enclosures are configured so that their respective centerlines are aligned,
  a pair of springs, each being located in said cavity and below and in contact with said bottom of one of said posts, and acting to push upward said post and cause said post orifice centerline to not align with said hole and aperture centerlines until said spring is push down and compressed, and thereby enabling an end of said material to pass through said fastener so that a portion of said material lies within said post orifice, and
  wherein said spring having a spring constant and said post orifice having a coefficient of friction with respect to said material, and
  wherein said spring constant and said coefficient of friction are chosen so as to yield said prescribed force being in the range of 2 to 25 pounds.

2. The fastener as recited in claim 1, wherein:
said rear enclosure having a boundary edge,
said front enclosure having a perimeter edge, and
said edges are configured to be opposing edges that are proximate each other.

3. The fastener as recited in claim 1, wherein:
said cavity having a vertical centerline,
said cavity having a pair of parallel vertical members, each of which is spaced apart from said vertical centerline, and
said pair of parallel vertical members configured to serve as a restraint in preventing the lateral movement of said pair of movable posts.

4. The fastener as recited in claim 2, wherein:
said cavity having a vertical centerline,
said cavity having a pair of parallel vertical members, each of which is spaced apart from said vertical centerline, and
said pair of parallel vertical members configured to serve as a restraint in preventing the lateral movement of said pair of movable posts.

5. The fastener as recited in claim 1, wherein:
each of said holes is spaced apart from said vertical centerline and has a section that includes a portion of said boundary edge.

6. The fastener as recited in claim 2, wherein:
each of said holes is spaced apart from said vertical centerline and has a section that includes a portion of said boundary edge.

7. The fastener as recited in claim 3, wherein:
each of said holes is spaced apart from said vertical centerline and has a section that includes a portion of said boundary edge.

8. The fastener as recited in claim 4, wherein:
each of said holes is spaced apart from said vertical centerline and has a section that includes a portion of said boundary edge.

9. The fastener as recited in claim 1, wherein:
said bottom portion of each of said pair of movable posts having a flat side,
said top portion of each of said posts is configured to move up and down through one of said spaced apart holes,
each of said posts is situated in said cavity so that said flat side is proximate said vertical centerline so that said flat side of each of said posts adjoin each other, and
each of said flat sides is configured to enable said adjoining flat sides to slide and move vertically up and down with respect to one another.

10. The fastener as recited in claim 2, wherein:
said bottom portion of each of said pair of movable posts having a flat side,
said top portion of each of said posts is configured to move up and down through one of said spaced apart holes,
each of said posts is situated in said cavity so that said flat side is proximate said vertical centerline so that said flat side of each of said posts adjoin each other, and each of said flat sides is configured to enable said adjoining flat sides to slide and move vertically up and down with respect to one another.

11. The fastener as recited in claim 3, wherein:

said bottom portion of each of said pair of movable posts having a flat side, said top portion of each of said posts is configured to move up and down through one of said spaced apart holes, each of said posts is situated in said cavity so that said flat side is proximate said vertical centerline so that said flat side of each of said posts adjoin each other, and each of said flat sides is configured to enable said adjoining flat sides to slide and move vertically up and down with respect to one another.

12. The fastener as recited in claim 4, wherein:

said bottom portion of each of said pair of movable posts having a flat side, said top portion of each of said posts is configured to move up and down through one of said spaced apart holes, each of said posts is situated in said cavity so that said flat side is proximate said vertical centerline so that said flat side of each of said posts adjoin each other, and each of said flat sides is configured to enable said adjoining flat sides to slide and move vertically up and down with respect to one another.

13. The fastener as recited in claim 5, wherein:

said bottom portion of each of said pair of movable posts having a flat side, said top portion of each of said posts is configured to move up and down through one of said spaced apart holes, each of said posts is situated in said cavity so that said flat side is proximate said vertical centerline so that said flat side of each of said posts adjoin each other, and each of said flat sides is configured to enable said adjoining flat sides to slide and move vertically up and down with respect to one another.

14. The fastener as recited in claim 1, wherein:

said front enclosure perimeter edge having a pair of vertically protruding members, each of which is configured to aid in joining said edges of said enclosures.

15. The fastener as recited in claim 2, wherein:

said front enclosure perimeter edge having a pair of vertically protruding members, each of which is configured to aid in joining said edges of said enclosures.

16. The fastener as recited in claim 3, wherein:

said front enclosure perimeter edge having a pair of vertically protruding members, each of which is configured to aid in joining said edges of said enclosures.

17. The fastener as recited in claim 4, wherein:

said front enclosure perimeter edge having a pair of vertically protruding members, each of which is configured to aid in joining said edges of said enclosures.

18. The fastener as recited in claim 5, wherein:

said front enclosure perimeter edge having a pair of vertically protruding members, each of which is configured to aid in joining said edges of said enclosures.

19. The fastener as recited in claim 9, wherein:

said front enclosure perimeter edge having a pair of vertically protruding members, each of which is configured to aid in joining said edges of said enclosures.

20. The fastener as recited in claim 10, wherein:

said front enclosure perimeter edge having a pair of vertically protruding members, each of which is configured to aid in joining said edges of said enclosures.

* * * * *